United States Patent
Shinohara et al.

(10) Patent No.: US 9,033,485 B2
(45) Date of Patent: May 19, 2015

(54) IMAGE FORMING METHOD (71) Applicant: FUJIFILM CORPORATION, Minato-ku, Tokyo (JP)

(72) Inventors: Ryuji Shinohara, Kanagawa (JP); Naotaka Wachi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 80 days.

(21) Appl. No.: 13/756,539

(22) Filed: Feb. 1, 2013

(65) Prior Publication Data

US 2013/0250016 A1 Sep. 26, 2013

(30) Foreign Application Priority Data

Mar. 26, 2012 (JP) ................................. 2012-070167

(51) Int. Cl.
| | | |
|---|---|---|
| *B41J 2/01* | (2006.01) | |
| *C09D 11/30* | (2014.01) | |
| *B41J 2/21* | (2006.01) | |
| *C09D 11/12* | (2006.01) | |
| *C09D 11/322* | (2014.01) | |
| *C09D 11/38* | (2014.01) | |

(52) U.S. Cl.
CPC ............... *C09D 11/30* (2013.01); *B41J 2/2107* (2013.01); *C09D 11/12* (2013.01); *C09D 11/322* (2013.01); *C09D 11/38* (2013.01)

(58) Field of Classification Search
CPC .......... B41J 2/01; B41J 2/2107; C09D 11/30; C09D 11/322; C09D 11/38; C09D 11/40
USPC ............. 347/21, 95–101, 105, 106; 106/31.6; 427/256
See application file for complete search history.

(56) References Cited

U.S. PATENT DOCUMENTS 6,634,729 B1* 10/2003 Schuman et al. ................. 347/2
2006/0017767 A1* 1/2006 Matsuzawa et al. ............ 347/21

(Continued)

FOREIGN PATENT DOCUMENTS

| | | |
|---|---|---|
| JP | 4-18465 A | 1/1992 |
| JP | 2867491 B2 | 3/1999 |
| JP | 2004-51779 A | 2/2004 |
| JP | 2005-82613 A | 3/2005 |
| JP | 2005-256237 | 9/2005 |
| JP | 2008-068576 | 3/2008 |
| JP | 2008-126559 | 6/2008 |
| JP | 2009-073059 | 4/2009 |
| JP | 2009-138317 | 6/2009 |
| JP | 2009-191135 A | 8/2009 |
| JP | 2010-155359 A | 7/2010 |
| JP | 2011-212940 | 10/2011 |
| JP | 2012-046740 | 3/2012 |
| JP | 2013018282 A | 1/2013 |
| WO | 01/48101 A1 | 7/2001 |

OTHER PUBLICATIONS

Partial English language translation of the following: Office action dated Mar. 4, 2014 from the Japanese Patent Office in a Japanese patent application corresponding to the instant patent application. This office action translation is submitted now in orde to supplement the understanding of patent document JP 2011-212940,JP2012-046740,JP2009-073059,JP2009-138317,JP2008-126559,JP2005-256237 and JP2008-068576 which are cited in the office action and are being disclosed in the instant information Disclosure Statement.

*Primary Examiner* — Matthew Luu
*Assistant Examiner* — Rut Patel
(74) *Attorney, Agent, or Firm* — Solaris Intellectual Property Group, PLLC (57) ABSTRACT

The invention provides an image forming method including at least applying an ink composition to a recording medium to form an image, the recording medium having an absorption amount of the ink composition, within 20 msec$^{1/2}$ from a start of contact of the ink composition with the recording medium, of 20 ml/m$^2$ or larger according to the Bristow method and being conveyed in a feed direction at a conveying speed of 80 m/min or higher, and the ink composition containing at least a pigment, a compound represented by the following Formula (1), wax and water. In Formula (1), each of l, m, and n independently represents an integer of 1 or more; the sum of l, m, and n is from 3 to 15; and each AO of $(AO)_l$, $(AO)_m$, and $(AO)_n$ independently represents an ethyleneoxy group or a propyleneoxy group.

Formula (1)

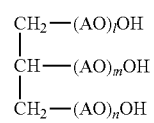

9 Claims, 1 Drawing Sheet

優　並　劣

(56) References Cited

U.S. PATENT DOCUMENTS

| | | | |
|---|---|---|---|
| 2009/0015617 A1* | 1/2009 | Odaka et al. | 347/16 |
| 2009/0202724 A1* | 8/2009 | Arai et al. | 427/256 |
| 2010/0194837 A1* | 8/2010 | Ohshima et al. | 347/102 |
| 2010/0245416 A1* | 9/2010 | Ohshima et al. | 347/9 |
| 2011/0057986 A1* | 3/2011 | Ikoshi et al. | 347/21 |
| 2011/0227994 A1* | 9/2011 | Yanagi | 347/21 |
| 2011/0242200 A1 | 10/2011 | Tojo et al. | |
| 2012/0026240 A1* | 2/2012 | Saito | 347/21 |
| 2012/0321792 A1 | 12/2012 | Shinohara et al. | |

* cited by examiner

IMAGE FORMING METHOD

CROSS-REFERENCE TO RELATED APPLICATION

This application is based on and claims priority under 35 USC 119 from Japanese Patent Application No. 2012-070167, filed on Mar. 26, 2012, the disclosure of which is incorporated by reference herein.

BACKGROUND

1. Technical Field

The present invention relates to an image forming method.

2. Related Art

In recent years, with the development of inkjet recording technology, an image forming technique using an inkjet method, which has been for application of photograph or offset printing, is proposed as a forming method of a high-resolution image, and it is desired to be capable of forming a high-quality image at a high speed.

Demand for high speed image formation is ever-increasing recently. For example, rubbing resistance after the image is formed is important in a system of forming an image at a high speed by using a roll paper. Namely, in a case that the rubbing resistance of the image is low, blur, bleeding or the like may be generated on the image when a paper is wound up by a roll in a short time to be piled up and the image is brought into contact with the paper, and product therefrom may lose a commercial value.

Examples of problems which may occur when the rubbing resistance of the formed image is poor include blurring of a formed character image and non-illegiblility of formed hollow character. Examples thereof further include inability of proper scanning of formed bar code images or QR CODE® images. Such a phenomenon tends to occur significantly on a paper on the surface of which ink is readily retained such as an inkjet paper which does not have a porous receiving layer (e.g., form paper for inkjet recording). In particular, a form paper is generally used for a high speed image forming application, and an image thereon demands a high strength against rubbing.

On other hand, an aqueous ink is drawing attention for uses in inkjet recording in view of the environment conservation and the like. For example, from the viewpoint of print quality such as the jetting stability of an ink or small bleeding on a plain paper, an aqueous ink containing ethylene oxide of glycerin or propylene oxide adduct is disclosed (see, for example, Japanese Patent Application Laid-Open (JP-A) No. 2009-191135, JP-A No. 2005-82613, WO2001/048101, JP-A Nos. 04-18465 and 2004-51779).

Inks having the rubbing resistance by containing a wax as a smoothing agent are also disclosed (see, for example, JP-A No. 2010-155359 and Japanese Patent 2867491).

SUMMARY

The conventional arts described in JP-A Nos. 2009-191135, 2005-82613, WO2001/048101, JP-A Nos. 04-18465 and JP-A No. 2004-51779 respectively take jetting properties of an ink, bleeding of an image and the like which tends to appear when an image is formed into account, and the conventional arts described in JP-A No. 2010-155359 and Japanese Patent 2867491 further take the rubbing resistance of an image into account. However, it is still concerned that the rubbing resistance of an image is not sufficient when an image is formed at a high speed. Although Japanese Patent No. 2867491 aims a high quality at a high speed printing, confirmation of its performance is limited to uses thereof with a home use printer in working examples. In industrial printing, however, the conveying speed of a recording medium is incomparably faster than that of a home use printer.

The conventional art have not secured to form an image having an excellent rubbing resistance, a wide color reproduction range and a high color optical density on a recording medium such as a form paper when subjected to printing at such a high conveying speed.

The present invention has been made in view of the above circumstances, and provides an image forming method which may provide an image having improved rubbing resistance, a wide color reproduction range and a high color optical density even when image formation on a recording medium such as a form paper is performed at a high speed.

One exemplary embodiment of a first aspect of the present invention is (1) an image forming method comprising applying an ink composition to a recording medium to form an image, the recording medium having an absorption amount of the ink composition, within 20 msec$^{1/2}$ from a start of contact of the ink composition with the recording medium, of 20 ml/m$^2$ or larger according to the Bristow method and being conveyed in a feed direction at a conveying speed of 80 m/min or higher, and the ink composition comprising a pigment, a compound represented by the following Formula (1), a wax and water:

Formula (1)

wherein, in Formula (1), each of l, m, and n independently represents an integer of 1 or more; the sum of l, m, and n is from 3 to 15; and each AO of $(AO)_l$, $(AO)_m$, and $(AO)_n$ independently represents an ethyleneoxy group or a propyleneoxy group.

Another exemplary embodiment of the first aspect of the present invention is (2) the image forming method of (1), wherein each AO in Formula (1) is a propyleneoxy group.

Another exemplary embodiment of the first aspect of the present invention is (3) the image forming method of (1), wherein a content of the compound represented by Formula (1) is from 5.0 mass % to 40.0 mass % based on a total mass of the ink composition.

Another exemplary embodiment of the first aspect of the present invention is (4) the image forming method of (1), wherein:

each AO in Formula (1) is a propyleneoxy group; and a content of the compound represented by Formula (1) is from 5.0 mass % to 40.0 mass % based on a total mass of the ink composition.

Another exemplary embodiment of the first aspect of the present invention is (5) the image forming method of (1), wherein the wax is in a form of a wax particle.

Another exemplary embodiment of the first aspect of the present invention is (6) the image forming method of (1), wherein:

a content of the compound represented by Formula (1) is from 5.0 mass % to 40.0 mass % based on a total mass of the ink composition; and the wax is in a form of a wax particle.

Another exemplary embodiment of the first aspect of the present invention is (7) the image forming method of (1), wherein the wax is carnauba wax.

Another exemplary embodiment of the first aspect of the present invention is (8) the image forming method of (1), wherein:
a content of the compound represented by Formula (1) is from 5.0 mass % to 40.0 mass % based on a total mass of the ink composition;
the wax is in a form of a wax particle; and
the wax is carnauba wax.

Another exemplary embodiment of the first aspect of the present invention is (9) the image forming method of (1), wherein a content of the wax is from 0.05 mass % to 15.0 mass % based on a total mass of the ink composition.

Another exemplary embodiment of the first aspect of the present invention is (10) the image forming method of (1), wherein:
a content of the compound represented by Formula (1) is from 5.0 mass % to 40.0 mass % based on a total mass of the ink composition;
the wax is in a form of a wax particle; and
a content of the wax is from 0.05 mass % to 15.0 mass % based on a total mass of the ink composition.

Another exemplary embodiment of the first aspect of the present invention is (11) the image forming method of (1), wherein:
a content of the compound represented by Formula (1) is from 5.0 mass % to 40.0 mass % based on a total mass of the ink composition;
the wax is in a form of a wax particle;
the wax is carnauba wax; and
a content of the wax is from 0.05 mass % to 15.0 mass % based on a total mass of the ink composition.

Another exemplary embodiment of the first aspect of the present invention is (12) the image forming method of (1), wherein:
each AO in Formula (1) is a propyleneoxy group;
a content of the compound represented by Formula (1) is from 5.0 mass % to 40.0 mass % based on a total mass of the ink composition;
the wax is in a form of a wax particle;
the wax is carnauba wax; and
a content of the wax is from 0.05 mass % to 15.0 mass % based on a total mass of the ink composition.

Another exemplary embodiment of the first aspect of the present invention is (13) the image forming method of (1), wherein the ink composition comprises resin particles at a content of from 0 mass % to 1 mass % based on a total mass of the ink composition.

Another exemplary embodiment of the first aspect of the present invention is (14 the image forming method of (1), wherein:
each AO in Formula (1) is a propyleneoxy group;
a content of the compound represented by Formula (1) is from 5.0 mass % to 40.0 mass % based on a total mass of the ink composition;
the wax is in a form of a wax particle;
the wax is carnauba wax;
a content of the wax is from 0.05 mass % to 15.0 mass % based on a total mass of the ink composition; and
the ink composition comprises resin particles at a content of from 0 mass % to 1 mass % based on a total mass of the ink composition.

Another exemplary embodiment of the first aspect of the present invention is (15) the image forming method of claim 7, wherein the resin particles are self-dispersing resin particles comprising a polymer which comprises a hydrophilic structural unit and a hydrophobic structural unit and has a glass transition temperature of 80° C. or higher.

Another exemplary embodiment of the first aspect of the present invention is (16) the image forming method of (1), wherein:
each AO in Formula (1) is a propyleneoxy group;
a content of the compound represented by Formula (1) is from 5.0 mass % to 40.0 mass % based on a total mass of the ink composition;
the wax is in a form of a wax particle;
the wax is carnauba wax;
a content of the wax is from 0.05 mass % to 15.0 mass % based on a total mass of the ink composition;
the ink composition comprises resin particles at a content of from 0 mass % to 1 mass % based on a total mass of the ink composition; and
the resin particles are self-dispersing resin particles comprising a polymer which comprises a hydrophilic structural unit and a hydrophobic structural unit and has a glass transition temperature of 80° C. or higher.

DETAILED DESCRIPTION

An image forming method of one embodiment of the invention includes at least applying an ink composition (hereinafter, also simply referred to as "ink") to a recording medium, the recording medium having an absorption amount of the ink composition within 20 $msec^{1/2}$ from the start of contact of the ink composition with the recording medium of 20 $ml/m^2$ or larger according to the Bristow method and being conveyed in a feed direction at a conveying speed of 80 m/min or higher, and the ink composition containing at least a pigment, a compound represented by Formula (1) explained below, wax and water.

The image forming method may further include, as needed, other processes such as heat-fixing the formed image.

A form paper used for application of a ledger sheet, a bill statement, a direct mail or the like is mass-produced. Therefore, a plain paper is increasingly used in view of the cost. Here, a recording medium which is generally referred to as a plain paper includes an inkjet form paper which does not have a porous receiving layer (e.g., inkjet form paper) and has a higher permeability of an ink composition than that of a coated paper having a coating layer on the surface of the recording medium, and an absorption amount of the ink composition within 20 $msec^{1/2}$ from the start of contact of the ink composition with the recording medium of 20 $ml/m^2$ or larger according to the Bristow method.

When an ink is applied to such a recording medium having a high ink permeability, since the recording medium easily absorbs the ink, pigments may not be left on the surface of the recording medium, the color reproduction range of an image may become narrow or the color optical density may become small. By the permeation of an ink, the ink may sometimes penetrate the recording medium to the back side thereof to offset (also referred to as strike-through). Offset of an ink needs is desired to be suppressed for a ledger sheet, a bill statement, a direct mail or the like, since there are many cases where duplex printing is carried out for reducing the weight of such document for holding down the postal cost.

In such circumstances, by incorporating the compound represented by Formula (1) into an ink, it may become difficult for the ink to penetrate a recording medium and strike-through may be suppressed; therefore, a pigment may tend to be left on the surface of the recording medium and an image having a wide color reproduction range and a high color optical density can be formed On the other hand, in an industrial printing process, a recording medium is usually conveyed by being passed through a pair of rollers and is dried by using a heating roller of a pair of rollers. Therefore, an external load applied to an image is large under an environment in which the recording medium is conveyed in a feed direction at a conveying speed of 80 m/min or higher. In the conveying process for a recording medium, the color optical density of the image may become low and the color reproduction range may become narrow when an image forming portion of an ink droplet is lost due to an external load.

In view of addressing this, by incorporating a wax in the ink, a slipping property may be provided to the surface of the image forming portion, and the rubbing resistance against the external load due to high speed conveyance of the recording medium may be provided.

Therefore, an image having an excellent rubbing resistance, a wide color reproduction range and a high color optical density may be formed by the above-mentioned image forming method even when the image is formed at a high speed with using a plain paper having high ink permeability.

A "form paper", which may be used as the recording medium, is also referred to as a "continuous form paper". It is a paper which is suitable for form processing and is used for an application such as a ledger sheet, an application form, a bill statement, a flyer, a catalog or a direct mail in the field of business form.

The form paper is also used as a pressure bonding form (e.g., pressure bonding postcard) on which an adherent is applied on the surfaces of two-folded paper which is opposing each other in such a manner that the surfaces thereof are bonded. When the form paper is a pressure bonding form, image formation may be performed on the adherent.

The ink application process included in the image forming method and other processes which can be provided as needed will be described in detail.

Ink Application Process

In the process of ink application, in the Bristow method, an ink composition is applied to a recording medium, in which the recording medium has an absorption amount of the ink composition within 20 $msec^{1/2}$ from the start of contact of the ink composition with the recording medium of 20 $ml/m^2$ or larger according to the Bristow method and is conveyed in a feed direction at a conveying speed of 80 m/min or higher, and the ink composition contains at least a pigment, a compound represented by Formula (1), wax and water.

In the ink application, the conveying speed of the recording medium conveyed in a feed direction is set to be 80 m/min or higher, and many images are formed on many sheets of paper or a long rolled paper at a high speed. Generally, in cases where the conveying speed is high, when the dropped ink composition does not quickly penetrate a recording medium or when an image cannot obtain a certain degree of strength in a short time, the image quality tends to decrease by rubbing. This phenomenon is likely to occur when the conveying speed is in the range of 80 m/min or higher.

From the viewpoint of increasing the speed of the image formation, the higher conveying speed is, the more preferable. The conveying speed is preferably 100 m/min or higher, and more preferably 150 m/min or higher. The upper limit of the conveying speed is not particularly limited, while it may be preferably 350 m/min from the viewpoint of need of conveying the recording medium stably.

The formation of an image by using an inkjet method can be performed by jetting an ink composition on a desired recording medium by providing an energy. Preferable examples of the image forming method include a method described in JP-A No. 2003-306623 paragraphs 0093 to 0105.

The inkjet method is not particularly limited, and any of the known methods such as a charge control method in which an ink is jetted by using an electrostatic attractive force, a piezo inkjet method in which an ink is jetted by using a piezoelectric element which generates a mechanical strain by applying a voltage, an acoustic inkjet method in which an electric signal is changed into an acoustic beam and an ink is irradiated with the acoustic beam to be jetted by using the radiation pressure thereof, and a thermal inkjet (BUBBLE JET®) method in which an ink is heated to form a bubble and a generated pressure is employed, can be employed.

Examples of the inkjet method include a method in which an ink having a low concentration referred to as a photo ink is jetted in a large number of small volume droplets, a method in which the image quality is improved by using plural inks having substantially the same hue and different concentrations, and a method of using a colorless and transparent ink.

As the inkjet method, a piezo inkjet method is suitable. The continuous jetting performance and the jetting stability of an ink may be improved by combining the ink composition or an ink set including the ink composition and the piezo inkjet method. The strain mode of the piezoelectric element in the piezo inkjet method may be any of a bend mode, a push mode and a shear mode. A configuration of the piezoelectric element and the structure of the piezo head is not particularly restricted, and known techniques may be employed.

An ink nozzle or the like which is used when recording is performed by the inkjet method is not particularly restricted, and can be suitably selected in accordance with the intended use.

Preferable examples of the inkjet method which to be used herein include an embodiment in which a line-type inkjet method using a line head is employed in which recording elements are arrayed to covering the whole range of one side of the recording media, while a shuttle-type inkjet method in which recording is performed by using a short serial head and scanning the head in the width direction of the recording medium may be also employed as long as the conveying speed can be kept at 80 m/min or higher as mentioned above. When the line-type inkjet method is employed, an image recording can be performed on the entire surface of the recording medium by scanning the recording medium in a direction orthogonal to the array direction of the recording media (i.e., in a feed direction).

The amount of droplet of an ink composition to be jetted is preferably 0.5 to 6 pl (picoliters), more preferably 1 to 5 pl, and still more preferably 2 to 4 pl, from the viewpoint of obtaining a high-resolution image.

Next, the ink composition will be explained in detail.

Ink Composition

The ink composition contains at least a pigment, a compound represented by Formula (1), a wax and water.

Pigment

The ink composition contains at least one kind of pigment.

The pigment is not particularly limited, and may be appropriately selected according to the purpose. Any of organic pigments and inorganic pigments may be used.

Examples of the organic pigments include azo pigments, polycyclic pigments, dye chelates, nitro pigments, nitroso pigments, and aniline black. Among these, azo pigments and polycyclic pigments are preferable. Examples of the azo pigments include azo lakes, insoluble azo pigments, condensed azo pigments, and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Examples of the dye chelates include basic dye type chelates and acidic dye type chelates.

Examples of the inorganic pigments include titanium oxide, iron oxide, calcium carbonate, barium sulfate, aluminum hydroxide, barium yellow, cadmium red, chrome yellow, and carbon black. Among these, carbon black is preferable. Examples of the carbon black include those produced according to any of known methods such as a contact method, a furnace method and a thermal method. Among these pigments, a water-dispersible pigment is preferable.

Specific examples of the water-dispersible pigment include the following pigments of (1) to (4).

(1) An encapsulated pigment, that is, a polymer dispersion in which a pigment is incorporated in fine particles of a polymer. More specifically, the encapsulated pigment is a pigment coated with a hydrophilic and water-insoluble resin and has hydrophilicity due to the resin layer provided on the surface of the pigment, and therefore, the encapsulated pigment is dispersible in water.

(2) A self-dispersing pigment, that is, a pigment which has at least one kind of hydrophilic group at the surface, and exhibits at least any of water-solubility and water-dispersibility in the absence of a dispersant. More specifically, the self-dispersing pigment is a pigment produced mainly by subjecting carbon black or the like to a surface oxidation treatment to render the pigment hydrophilic, and thus making the pigment to disperse in water.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

Here, the (1) encapsulated pigment will be described in detail.

The resin for the encapsulated pigment is not limited. The resin is preferably a polymer compound which has self-dispersing ability or dissolving ability in a mixed solvent of water and a water-soluble organic solvent and has an anionic group (acidic). Usually, the resin preferably has a number average molecular weight of from about 1,000 to about 100,000, and more preferably from about 3,000 to about 50,000. It is also preferable that the resin be dissolved in an organic solvent to form a solution. When the number average molecular weight of the resin is within this range, the resin may exhibit its function as a coating layer for the pigment, or as a coating layer when used in an ink. The resin is preferably used in the form of a salt of an alkali metal or an organic amine.

Specific examples of the resin for the encapsulated pigment include materials having an anionic group, such as thermoplastic, thermosetting or modified acrylic resins, epoxy resins, polyurethane resins, polyether resins, polyamide resins, unsaturated polyester resins, phenolic resins, silicone resins and fluorine resins; polyvinyl resins such as vinyl chloride, vinyl acetate, polyvinyl alcohol and polyvinyl butyral; polyester resins such as alkyd resins and phthalic acid resins; amino materials such as melamine resins, melamine-formaldehyde resins, aminoalkyd co-condensated resins, urea resins, and urea resins; and copolymers and mixtures thereof.

Among these resins, the anionic acrylic resins may be obtained by, for example, polymerizing, in a solvent, an acrylic monomer having an anionic group (hereinafter referred to as "anionic group-containing acrylic monomer") and, as needed, another monomer capable of being copolymerized with the anionic group-containing acrylic monomer. Examples of the anionic group-containing acrylic monomer include acrylic monomers having one or more anionic groups selected from the group consisting of a carboxyl group, a sulfonic acid group and a phosphonic acid group. Among them, an acrylic monomer having a carboxyl group is particularly preferable. Specific examples of the acrylic monomer having a carboxyl group include acrylic acid, methacrylic acid, crotonic acid, ethacrylic acid, propylacrylic acid, isopropylacrylic acid, itaconic acid, and fumaric acid. Among these, acrylic acid and methacrylic acid are preferable.

The encapsulated pigment may be produced by a conventional physical or chemical method, using the above-mentioned ingredients. For example, the encapsulated pigment may be produced by the methods described in any one of JP-A Nos. 09-151342, 10-140065, 11-209672, 11-172180, 10-25440 and 11-43636. Specific examples of the method include the phase inversion emulsification method and the acid precipitation method described in each of JP-A Nos. 09-151342 and 10-140065, and among them, the phase inversion emulsification method is preferable in view of dispersion stability. Details of the phase inversion emulsification method will be described below.

The self-dispersing pigment is also one of preferable examples. The self-dispersing pigment has a large number of hydrophilic functional groups and/or salts thereof (hereinafter, referred to as "dispersibility imparting group") which is directly or indirectly bound to a surface of the pigment via an alkyl group, an alkyl ether group, an aryl group or the like, and is capable of dispersing in an aqueous medium without using a dispersant for dispersing pigments. Here, the term "dispersing in an aqueous medium without using a dispersant" implies that the pigment is capable of dispersing in an aqueous medium even though a dispersant for dispersing pigments is not used.

Since an ink containing a self-dispersing pigment as the colorant does not need to contain a dispersant which is usually incorporated to disperse pigments, it is possible to easily prepare an ink in which foaming due to decrease in the defoaming property caused by the dispersant scarcely occur, and which has excellent jetting stability. Examples of the dispersibility imparting group which is bound to the surface of the self-dispersing pigment include —COOH, —CO, —OH, —SO$_3$H, —PO$_3$H$_2$, a quaternary ammonium group, and salts thereof. The dispersibility imparting group may be bonded to the surface of the pigment by applying a physical treatment or a chemical treatment to the pigment, thereby bonding (grafting) the dispersibility imparting group or an active species having a dispersibility imparting group to the pigment surface. Examples of the physical treatment include vacuum plasma treatment. Examples of the chemical treatment include: a wet oxidation method which includes oxidizing the pigment surface in water by an oxidizing agent; and a method which includes bonding a carboxyl group to the pigment surface via a phenyl group by bonding p-aminobenzoic acid to the pigment surface.

The self-dispersing pigment may be preferably, for example, a self-dispersing pigment which is surface-treated by an oxidation treatment using hypohalous acid and/or hypohalite or an oxidation treatment using ozone. The self-dispersing pigment may be a commercially available product, and examples thereof include MICROJET CW-1 (trade name, manufactured by Orient Chemical Industries, Ltd.), CAB-O-JET200, CAB-O-JET300 (trade name, manufactured by Cabot Corp.).

Preferable examples of the pigment include an encapsulated pigment in which, among pigment dispersants, a water-insoluble resin is used and the surface of a pigment is at least partially coated with the water-insoluble resin, e.g., a polymer emulsion in which a pigment is contained in water-insoluble resin particles. Specifically, a water-dispersible pigment in which a surface of the pigment is at least partially coated with a water-insoluble resin to form a resin layer on the surface of the pigment so that the pigment can disperse in water is preferable. The use of such an encapsulated pigment coated with a water-insoluble resin is preferable from the viewpoint of suppressing aggregation of the pigment and forming high resolution images when high-speed recording is performed.

The phase inversion emulsification method is basically a self-dispersing method in which a mixed/molten material formed from a pigment and a resin is dispersed in water, the resin having a self-dispersing ability or dissolving ability. The mixed/molten material include a curing agent or a polymer compound. Here, the "mixed/molten material" may be in a state in which ingredients (namely, the pigment and the resin) are mixed but are not dissolved, a state in which the ingredients are dissolved and mixed, or a state in which both of the two states are included. Specific examples of a production method according to the "phase inversion emulsification method" include a method described in JP-A No. 10-140065.

JP-A Nos. 9-151342 and 10-1400645 may be referred to for specific processes of the phase inversion emulsification method and the acid precipitation method.

—Pigment Dispersant—

A pigment dispersant can be used for easily dispersing the pigment when the pigment is dispersed and for stabilizing a state of the resultant dispersion. Examples of the pigment dispersant include nonionic compounds, anionic compounds, cationic compounds, and amphoteric compounds. Examples thereof include copolymers of monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, diester maleate, fumaric acid, fumaric acid monoester, vinylsulfonic acid, styrene sulfonic acid, sulfonated vinyl naphthalene, vinyl alcohol, acrylamide, methacryloxyethyl phosphate, bis-methacryloxyethyl phosphate, methacryloxyethylphenyl acid phosphate, ethylene glycol dimethacrylate, diethylene glycol dimethacrylate, styrene derivatives such as styrene, $\alpha$-methyl styrene, and vinyltoluene, vinylcyclohexane, vinylnaphthalene, vinyl naphthalene derivatives, alkyl esters of acrylic acid which may have an aromatic group as a substituent, phenyl ester of acrylic acid, alkyl esters of methacrylic acid which may have an aromatic group as a substituent, phenyl ester of methacrylic acid, cycloalkyl ester of methacrylic acid, alkyl ester of crotonic acid, dialkyl ester of itaconic acid, dialkyl ester of maleic acid, and derivatives of the compounds mentioned above.

A polymer or copolymer obtained by polymerizing one kind of monomer having an $\alpha,\beta$-ethylenic unsaturated group singly or copolymerizing two or more kinds of the monomers having an $\alpha,\beta$-ethylenic unsaturated group can be used as a polymeric dispersant. Specific examples thereof include an alkyl acrylate-acrylic acid copolymer, an alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, polyester, and polyvinyl alcohol.

The pigment dispersant preferably has a weight average molecular weight of 2,000 to 60,000.

The addition amount of the pigment dispersant in the pigment is preferably from 10% to 100%, more preferably from 20% to 70%, and still more preferably from 40% to 50%, in terms of mass, relative to the amount of the pigment.

The pigment is preferably a resin-coated pigment in which at least a part of the surface of the pigment is covered with a crosslinked polymer in which a water-soluble resin is crosslinked by a crosslinking agent. The water-soluble resin functions as a dispersant which disperses the pigment. When the pigment is coated with the crosslinked polymer, a pigment dispersion which uses the pigment or an ink composition which uses the pigment dispersion has an excellent stability (including stability against pH change and stability against temperature change).

Examples of the water-soluble resin include polyvinyls, polyurethanes and polyesters. Among these, polyvinyls are preferable.

The water-soluble resin has, in the molecule thereof, a group which is subjected to a cross-linking reaction by a cross-linking agent. Examples of such a group include a carboxyl group or salts thereof, an isocyanate group and an epoxy group. From the viewpoint of improving the dispersibility, it is preferable that the water-soluble resin has a carboxyl group or salts thereof.

A copolymer obtained by using a carboxyl group-containing monomer as a component for copolymerization is preferable as the water-soluble resin. Examples of the carboxyl group-containing monomer include methacrylic acid, $\beta$-carboxyethyl acrylate, fumaric acid, itaconic acid, maleic acid and crotonic acid. Among these, methacrylic acid and $\beta$-carboxyethyl acrylate are preferable from the viewpoint of cross-linking property and dispersion stability.

Other than the carboxyl group-containing monomer, an arbitrarily selected hydrophilic monomer and/or an arbitrarily selected hydrophobic monomer may be used as a component for copolymerization. The hydrophilic monomer may be ionic or nonionic. The hydrophobic monomer is not particularly restricted, while it may be preferably alkyl methacrylate having 1 to 20 carbon atoms or alkyl acrylate having 1 to 20 carbon atoms.

The water-soluble resin may be a random polymer or a block or graft polymer.

The acid value of the water-soluble resin (the mass of KOH in terms of microgram that is needed to neutralize 1 g of water-soluble resin, unit: mgKOH/g) is preferably 135 to 250, more preferably and 135 to 200 and particularly preferably 135 to 180, from the viewpoint of the dispersibility and dispersion stability of the pigment.

The synthesis method the water-soluble resin as a polymer is not particularly restricted, while random copolymerization of vinyl monomer is preferable from the viewpoint of dispersion stability.

As the cross-linking agent, a compound having two or more sites which initiate a cross-linking reaction can be used. Among thereof, an epoxy compound having two or more functional groups is preferable from the viewpoint of the excellent reactivity with a carboxyl group. Specific examples of the epoxy compound having two or more functional groups include ethylene glycol diglycidyl ether, polyethylene glycol diglycidyl ether, 1,6-hexanediol glycidyl ether, diethylene glycol diglycidyl ether, polyethylene glycol diglycidyl ether, dipropyrene glycol diglycidyl ether, and polypropylene glycol diglycidyl ether. Polypropylene glycol diglycidyl ether and diethylene glycol diglycidyl ether are preferable.

The mole ratio of the cross-linking site in the cross-linking agent and the site which is to be cross-linked and is in the water-soluble resin (cross-linking site in the cross-linking agent: to-be-cross-linked site in the water-soluble resin) is, from the viewpoint of the cross-linking reaction rate and the stability of the dispersion after cross-linking, preferably in a range of from 1:1.1 to 1:10, more preferably from 1:1.1 to 1:5, and still more preferably from 1:1.1 to 1:3.

The amount of the water-soluble resin is preferably from 10 mass % to 200 mass %, more preferably from 20 mass % to 150 mass %, and still more preferably from 30 mass % to 100 mass %, with respect to the amount of the pigment.

The resin-coated pigment, at least a part of a surface which is coated with a cross-linked polymer in which a water-soluble resin is crosslinked by a cross-linking agent, may be obtained by dispersing a pigment using the water-soluble resin and then performing crosslinking by using the cross-linking agent. Following is an exemplary embodiment of a preferable preparation method, which includes the following processes (1) to (3).

(1) A dispersing process in which a pigment dispersion liquid is obtained by dispersing a pigment and a water-soluble resin in water or an aqueous solution of a polar solvent.
(2) A crosslinking process in which a cross-linking agent is added to the pigment dispersion liquid obtained in the process (1) and the resultant is heated to perform crosslinking reaction so that the surface of the pigment is coated with a cross-linked polymer.
(3) A process of purifying a resin-coated pigment which is coated with the cross-linked polymer.

In addition to these processes, another process may be appropriately performed as need. In the process (1), known polar solvents or the like may be used as appropriate.

The pigment may be used singly, or plural kinds of pigments in one or more of the above-mentioned groups may be selected and combined to be used.

The content of the pigment in the ink composition is preferably from 0.1 mass % to 15 mass %, more preferably from 0.5 mass % to 12 mass % and still more preferably from 1 mass % to 10 mass %, based on a total mass of the ink from the viewpoint of color density, graininess, ink stability, and jetting reliability.

Compound Represented by Formula (1)

The ink contains at least one compound represented by Formula (1). The compound represented by Formula (1) is an alkylene oxide adduct of glycerol represented by the following structure. In corporation of the compound in the ink composition may enable to suppress the permeability of the ink composition to a recording medium to a degree that the rubbing resistance of an image is not considerably degraded.

Formula (1)

In Formula (1), each of l, m, and n independently represents an integer of 1 or more, and the sum of l, m, and n (l+m+n) is from 3 to 15. When the value of l+m+n is 3 or more, the effect of suppressing curling may be favorable. When the value of l+m+n is 15 or lower, favorable jetting performance may be maintained. In particular, the value of l+m+n is preferably in the range of 3 to 12 and more preferably in the range of 3 to 10. Each AO of $(AO)_l$, $(AO)_m$, and $(AO)_n$ in Formula (1) independently represents an ethyleneoxy group (which may sometimes be abbreviated as EO) or a propyleneoxy group (which may sometimes be abbreviated as PO). In particular, a propyleneoxy group is preferable. Each AO of $(AO)_l$, $(AO)_m$, and $(AO)_n$ may be the same or different.

Examples of the compound represented by Formula (1) are shown below. The value in the brackets is an SP value. It is noted that the invention is not limited thereto.

$nC_4H_9O(AO)_4$—H
(AO is EO or PO (EO:PO=1:1), SP value=20.1)
$nC_4H_9O(AO)_{10}$—H
(AO is EO or PO (EO:PO=1:1), SP value=18.8)
$HO(A'O)_{40}$—H
(A'O is EO or PO (EO:PO=1:3), SP value=18.7)
$HO(A''O)_{55}$—H
(A''O is EO or PO (EO:PO=5:6), SP value=18.8)
$HO(PO)_3$—H (SP value=24.7)
$HO(PO)_7$—H (SP value=21.2)
1,2-hexanediol (SP value=27.4)
EO represents an ethyleneoxy group, and PO represents a propyleneoxy group.

As the alkylene oxide adduct of glycerol, any of commercially available products currently marketed may be used. Examples of the commercial available alkylene oxide adduct of glycerol include, as polyoxypropylated glycerol (ether of polypropylene glycol and glycerol), SANNIX GP-250 (average molecular weight: 250), SANNIX GP-400 (average molecular weight: 400), and SANNIX GP-600 (average molecular weight: 600) (trade names, manufactured by Sanyo Chemical Industries, Ltd.), LEOCON GP-250 (average molecular weight: 250), LEOCON GP-300 (average molecular weight: 300), LEOCON GP-400 (average molecular weight: 400), LEOCON GP-700 (average molecular weight: 700) (trade names, manufactured by LION Corporation), and polypropylenetriol glycoltriol types (average molecular weight: 300; and average molecular weight: 700) (manufactured by Wako Pure Chemical Ind., Ltd.).

The SP value (solubility parameter/unit: $(cal/cm^3)^{1/2}$) is a value expressed by the square root of cohesive energy of molecules. SP values can be calculated by the method described in R. F. Fedors, Polymer Engineering Science, 14, pp. 147 to 154 (1974).

The SP value is preferably in the range of 27.5 or lower.

The ink composition may further contain other water-soluble organic solvent other than the compound represented by Formula (1). In this case, 70% by mass or more of the water-soluble organic solvents are preferably water-soluble organic solvents having an SP value of 27.5 or lower. When the water-soluble organic solvents having an SP value of 27.5 or lower are used, the occurrence of curling under various environmental humidity after recording can be further suppressed. Moreover, the fixability may also increase due to interaction thereof with resin particles. In particular, when the proportion of water-soluble organic solvents having a relatively low SP value (≤27.5) is increased, the rubbing resistance of images can be increased. Further, offset can be effectively suppressed thereby.

A content of the compound represented by Formula (1) in the ink composition is preferably from 5.0 mass % to 40.0 mass %, more preferably from 7.0 mass % to 35.0 mass %, and particularly preferably from 8.0 mass % to 30.0 mass %, based of a total mass of the ink composition.

When the content of the compound represented by Formula (1) is 5.0 mass % or higher, the permeability of the ink composition to a recording medium is moderated and strike-through of the ink may be further suppressed.

Examples of the other water-soluble organic solvent include water-soluble organic solvents described in the paragraphs 0036 to 0039 in JP-A No. 2009-190379, and these are appropriately selected to be used.

Wax

The ink composition contains at least one wax.

Examples of the wax include natural wax and synthetic wax.

Examples of the natural wax include a petroleum wax, a plant wax and an animal wax.

Examples of the petroleum wax include paraffin wax, microcrystalline wax and petrolatum. Examples of the plant wax include carnauva wax, candelilla wax, rice wax and Japan wax. Examples of the animal wax include lanolin and beewax.

Examples of the synthetic wax include synthetic hydrocarbon wax and modified wax.

Examples of the synthetic hydrocarbon wax include polyethylene wax and Fischer-Tropsch wax; and examples of the modified wax include paraffin wax derivatives, montan wax derivatives, and microcrystalline wax derivatives.

Paraffin wax has hydrocarbon having 20 to 40 carbon atoms as a main ingredient. Paraffin wax is preferable from the viewpoint of the gloss of an image, suppression of water evaporation from the tip of the nozzle, and an excellent water-retaining effect.

Polyethylene wax is preferable from the viewpoint that the wax has an excellent compatibility with resins and is thus likely to produce a uniform and favorable image. Further, polyethylene wax can be easily modified. Modified glycol-modified polyethylene wax may be imparted with wettability that is attributable to glycol, and is therefore more preferable from the viewpoint that a wettability effect of the ink composition at the nozzle tips is exhibited, and accordingly, jetting stability is more effectively exhibited.

Among the above, the wax is preferably carnauba wax.

The wax may be contained in the application liquid by any method, such as in the form of a solution dissolved in an appropriate solvent, in the form of an emulsified dispersion, or in the form of solid fine particle dispersion.

A well-known example of the emulsifying-dispersing method may be a method including dissolving the wax using an oil such as dibutyl phthalate, tricresyl phosphate, dioctyl sebacate, or tri(2-ethylhexyl)phosphate, or an auxiliary solvent such as ethyl acetate or cyclohexanone, and adding an emulsifying dispersant thereto, to mechanically produce an emulsified dispersion. In this case, it is also preferable to add an α-methylstyrene oligomer, or a polymer such as poly(t-butylacrylamide), for the purpose of adjusting the viscosity or refractive index of the oil droplets.

Examples of the method of dispersing solid particle include a method in which wax powder is dispersed in an appropriate solvent such as water by a ball mill, a colloid mill, a ibratory ball mill, a sand mill, a jet mill, a roller mill or ultrasonic wave to obtain a solid dispersion. In this case, protective colloids (e.g., polyvinyl alcohol), surfactants (e.g., anionic surfactants such as sodium triisopropyl naphthalene sulfonate, which is a mixture thereof in which three substitution positions of isopropyl group are different from each other) may be used. Beads such as zirconia are generally used as a dispersion medium in the mills. The water dispersion may preferably contain a preservative (e.g., benzisothiazolinone sodium salts) ed.

Particularly preferable is the emulsifying-dispersing method. The wax is preferably added to the ink composition in the form of dispersion such as in the form of wax emulsion or the like. Namely, the wax in the ink composition is preferably a wax particle, which may be also referred to as a "wax dispersion particle".

Wax Emulsion

The wax emulsion is a wax dispersion composition containing at least a wax, water, and an emulsifying dispersant which emulsifies and disperses the wax in water.

The emulsifying dispersant used for the wax emulsion may be selected from a variety of conventionally known emulsifying dispersants to be used.

A particularly preferable emulsifying dispersant is a dispersant represented by the following Formula (WA).

Formula (WA)

In Formula (WA), $R^3$ represents an alkyl group having 10 to 60 carbon atoms, an alkenyl group having 10 to 60 carbon atoms, an aralkyl group having 10 to 60 carbon atoms or an aryl group having 10 to 60 carbon atoms.

D is a group represented by —$(B)_n$-E. B represents —$CH_2CH_2O$—, —$CH_2CH_2CH_2O$—, —$CH(CH_3)CH_2O$— or —$CH_2CH(OH)CH_2O$—. n represents an integer from 1 to 50. E represents a hydrogen atom, an alkyl group having 1 to 8 carbon atoms, an aryl group having 6 to 8 carbon atoms, an alkylcarbonyl group having 2 to 8 carbon atoms or an arylcarbonyl group having 7 to 8 carbon atoms.

a and d each independently represent an integer of 1 to 6. Plural numbers of $R^3$, D and E, which exist when a or d is 2 or more, may be the same with each other or different from each other.

G represents a linking group having a valency of a+d, where 2≤a+d≤7.

The alkyl group, the alkenyl group, the aralkyl group and the aryl group represented by $R^3$ and the alkyl group, the aryl group, the alkylcarbonyl group and the arylcarbonyl group represented by E each independently may further have a substituent.

Further detailed description will be given.

$R^3$ represents an alkyl group having 10 to 60 carbon atoms, an alkenyl group having 10 to 60 carbon atoms, an aralkyl group having 10 to 60 carbon atoms or an aryl group having 10 to 60 carbon atoms.

The alkyl group, the alkenyl group, and the aralkyl group represented by $R^3$ may be straight chain, branched or cyclic. The alkyl group, the alkenyl group, the aralkyl group, and the aryl group represented by $R^3$ may each independently further include a substituent.

Preferable examples of $R^3$ include $C_gH_{2g+1}$ (in which g represents an integer of 12 to 60), eicosyl, and docosanyl. Preferable examples of $R^3$ further include dodecyl, myristyl, cetyl, stearyl, oleyl, eicosyl, docosasyl, triacontasyl, tetracontasyl, heptacontasyl, dinonylphenyl, didodecylphenyl, tetradecylphenyl, tripentylphenyl, and dodecylnaphthyl.

D is a polyoxyalkylene group represented by $—(B)_n$-E.

Here, B represents $—CH_2CH_2O—$, $—CH_2CH_2CH_2O—$, $—CH(CH_3)CH_2O—$, or $—CH_2CH(OH)CH_2O—$; and n represents an integer of 1 to 50.

B is preferably $—CH_2CH_2O—$, and n is preferably an integer of 5 to 30.

In $(B)_n$-E represented by D in Formula (WA), E represents a hydrogen atom, an alkyl group having 1 to 8 carbon atoms, an aryl group having 6 to 8 carbon atoms, an alkylcarbonyl group having 2 to 8 carbon atoms, or an arylcarbonyl group having 7 to 8 carbon atoms. The alkyl group, aryl group, alkylcarbonyl group, and arylcarbonyl group represented by E each independently may further include a substituent.

The alkyl group represented by E is preferably methyl, ethyl, propyl, butyl, hexyl, or cyclohexyl and particularly preferably methyl, ethyl, or propyl.

The alkylcarbonyl group represented by E is preferably acetyl, propionyl, butyroyl, pivaloyl, or cyclohexanecarbonyl, and particularly preferably acetyl.

The aryl group represented by E is preferably a phenyl group.

The arylcarbonyl group represented by E is preferably a benzoyl group.

E is particularly preferably a hydrogen atom, methyl, ethyl, propyl, acetyl, propionyl, or benzoyl.

G represents a linking group having a valency of a+d, which satisfies 2≤a+d≤7. When a+d is 2, G may be a single bond.

a+d is preferably from 2 to 5, more preferably from 2 to 4, and still more preferably from 2 or 3.

G is preferably an alkylene group, an arylene group, or a composite group thereof. G may be a divalent linking group that is interposed by a heterogeneous atom or a heterogeneous group of atoms such as an ester group, an ether group, an amido group, a sulfonyl group or a sulfur atom.

The heterogeneous atom or the heterogeneous group of atoms is particularly preferably an ester group, an ether group or an amido group. a and d each independently represent an integer of 1 to 6.

The dispersant represented by Formula (WA) desirably has a low solubility in an aqueous medium. For example, the solubility of the dispersant represented by Formula (WA) in water at 25° C. is preferably 0.5 mass % or less, and more preferably 0.1 mass % or less.

Compounds (WA-1) to (WA-19), which are specific examples of the compound represented by Formula (WA), are shown below, but the invention is not limited thereto.

-continued $x+y=12$

WA-19

$x+y=15$

A solvent for dispersing the wax in the wax emulsion may contain at least water, but not limited thereto.

For example, normal organic solvents can be selected as appropriate and used at the time of dispersing.

Preferable examples thereof include the organic solvents described in JP-A No. 2010-155359, paragraph 0049.

The dispersion stability of the wax in the wax emulsion may be improved by inclusion of these substances. The organic solvent may be mixed with the same or two or more of different solvents for use.

Details of dispersion particles of the wax (wax particle) in the wax emulsion are described below.

The wax particle is formed from at least a wax and an emulsifying dispersant represented by Formula (WA) (hereinafter, also referred to as a "specific dispersant"), and the content ratio of these ingredients is not particularly restricted. In embodiments, the wax particle may be formed from 25 mass % to 99 mass % of the wax and 1 mass % to 75 mass % of the dispersant with respect to the total mass of the wax particle. This is because, when the content of the wax is higher, the characteristics of the wax particles are more strongly exhibited.

Accordingly, it is preferable that the proportion of the amount of the specific dispersant in the wax particles be as small as possible.

In preferable embodiments, the wax and the specific dispersant which form the wax particle are mixed at a temperature which is higher than the melting temperature of the compound having the higher melting temperature among the compounds prior to dispersing the wax particle in water. These are preferably subjected to so-called melt-mixing. A water-containing solvent, which is to be a dispersion medium, is also heated at a high temperature, a mixture resulted by the melt-mixing is added thereto, and any of a variety of dispersing method is performed to form a fine dispersion. It is also preferable that a heated solvent is added to the mixture resulted by the melt-mixing so that the mixture is made into dispersion particles. In embodiments, after dissolving the wax and the specific dispersant in a non-aqueous organic solvent which dissolves the wax or the specific dispersant, the wax and the specific dispersant may be finely dispersed by using other water-soluble surfactants in water and added as wax particles. Preferable examples of the non-aqueous organic solvent include ethyl acetate.

In embodiments, it is also useful to remove the organic solvent after dispersing the wax and the specific dispersant in water and use the resultant as a wax particle dispersion. An advantage of the embodiments is that the wax and the specific dispersant can be melt-mixed in an organic solvent at a low temperature even when the melting temperatures of the wax and the specific dispersant are 100° C. or higher, and an aqueous dispersion of high melting temperature-wax particles can be prepared.

Here, the melting temperatures of the wax and the specific dispersant are not particularly limited, while being preferably from 50° C. to 200° C., more preferably from 60° C. to 200° C. and still more preferably 80° C. to 150° C.

The solvent may be most preferably water from the viewpoint of reducing impact to environment during the preparation of the ink composition. Accordingly, when a wax having a melting temperature of 80° C. is used, the wax needs to be dispersed with setting the temperature of water to 80° C. or higher.

An average particle size of the wax particles is preferably from 0.01 μm to 10 μm, more preferably from 0.05 μm to 5 μm, and still more preferably from 0.1 μm to 2 μm. The wax emulsion is preferably added to the ink composition in such a manner that the average particle size of the wax particles is in such range.

Content of Wax

The content of the wax in the ink composition is preferably from 0.05 mass % to 15.0 mass % based on a total mass of the ink composition.

When carrying out inkjet recording, in many cases, a coated paper such as that described in JP-A No. 2010-15539 is used as the recording medium in view of preventing strike-through due to bleeding of an ink or permeation of a recording medium. Since coated paper hardly absorbs an ink composition, the hardened film of an ink droplet formed on a recording medium tends to be left bulkier. Therefore, the amount of the wax composition (in particular wax emulsion) incorporated into an ink composition has tended to be large. Here, the wax emulsion is a composition which contains a dispersant in order to disperse wax, which hardly disperses in water. The larger the content of the wax emulsion in the ink is, the larger the content of the dispersant is.

However, in cases in which a recording medium that easily absorbs an ink is used, when the content of the wax emulsion in the ink is large, absorption of the ink composition applied on the recording medium is accelerated. Therefore, the content of the wax emulsion in the ink is preferably small (which may be, for example, 15 mass % or less), in view of avoiding compromising the effect of suppressing absorption of an ink to a recording medium by a compound represented by Formula (1).

When the wax is contained in the ink composition in a form of a wax emulsion, the content of the wax in the ink composition is referred to as a solid content of the wax emulsion.

The content of the wax as a solid content of the wax emulsion in the ink composition is more preferably from 0.07 mass % to 13.0 mass %, and further preferably from 0.10 mass % to 10.0 mass %.

The larger the content of the wax in the ink composition added is the more preferable from the viewpoint of the improvement of the rubbing resistance of an image. On the other hand, from the viewpoint of the jetting stability of an ink from an inkjet nozzle and the non-permeability of an ink to a recording medium, the content is preferably 10.0 mass % or less.

Water

The ink composition contains water. The amount of water is not particularly restricted. In embodiments, the amount of water is preferably from 10 mass % to 99 mass %, more preferably from 20 mass % to 80 mass %, still more preferably from 30 mass % to 70 mass % and particularly preferably from 40 mass % to 60 mass %, base on a total mass of the ink composition, from the viewpoint of securing the stability and jetting reliability.

The water is preferably pure water or ultrapure water in which ionic impurities are removed as much as possible, examples thereof including ion exchanged water, ultrafiltrated water, reverse osmosis water, and distilled water. The use of water which is sterilized by ultraviolet irradiation, addition of hydrogen peroxide or the like is suitable from the viewpoint of suppressing mildew or bacteria when the pigment dispersion liquid and the ink composition using the pigment dispersion liquid are stored for long periods.

Resin Particle

The ink composition may further contain at least one kind of resin particle.

Incorporation of resin particles in the ink composition may enable to improve the rubbing resistance of an image by carrying out a heat treatment or the like after the formation of the image. The presence of the resin particle may become, however, the cause of increase in the viscosity of the ink composition over time. From the viewpoint of the jetting stability of the ink composition, the amount of the resin particle in the ink composition is preferably 1 mass % or less in terms of solid content based on a total mass of the ink composition.

Since the presence of the resin particle may contribute to increase in the viscosity of the ink composition over time, it is difficult to restrain increase in the viscosity of the ink composition even if the ink is diluted by increasing an amount of a solvent used for preparation of the ink composition. Namely, it is difficult to restrain increase in the viscosity of the ink composition by adjusting the amount of the solvent used for preparation of the ink composition.

In particular, in order to carry out the high speed image formation, the jetting stability of an ink is important. In consideration of this point, the ink composition may preferably do not contain resin particles.

In a case in which the ink composition contains resin particles, the resin particle are preferably self-dispersing resin particles containing a polymer including a hydrophilic structural unit and a hydrophobic structural unit, and more preferably self-dispersing resin particles containing a polymer including a hydrophilic structural unit and a hydrophobic structural unit and having a glass transition temperature (Tg) of 80° C. or higher, in view of further increasing the rubbing resistance. The Tg of 80° C. or higher means that the polymer is hydrophobic. When the Tg of the polymer contained in the resin particles is 80° C. or higher, the fixability of the ink composition to the recording medium and the rubbing resistance of images formed from the ink composition may improve.

The glass transition temperature of the resin particle is preferably from 100° C. to 300° C., more preferably from 130° C. to 250° C., and further preferably from 160° C. to 200° C. When the glass transition temperature of the resin particle is 300° C. or lower, the rubbing resistance of the recorded image improves more effectively.

The glass transition temperature is the value measured under normal measurement conditions using a differential scanning calorimeter (DSC) EXSTAR6220 (manufactured by SII Nanotechnology Inc.). In a case in which the measurement is difficult due to decomposition of resin or the like, a calculated Tg which can be obtained by calculation according to the following Equation (T) is used.

$$1/Tg = \Sigma(X_i/Tg_i) \quad (T)$$

In Equation (T), a polymer, the Tg of which is calculated, is assumed as one in that n kinds of monomer components are copolymerized. $X_i$ is the weight fraction ($\Sigma X_i = 1$) of the i-th monomer, the "i" being varied from 1 to n. $Tg_i$ is the glass transition temperature (absolute temperature) of a homopolymer formed of the i-th monomer. $\Sigma(X_i/Tg_i)$ is the summation of $X_i/Tg_i$ in which the index of summation is i, the lower bound of summation is 1, and the upper bound of summation is n. Values described in "Polymer Handbook" (3rd Edition) (edited by J. Brandrup and E. H. Immergut (Wiley-Interscience, 1989)) are employed as the value ($Tg_i$) of the glass transition temperature of the homopolymer of each monomer.

Examples of the resin particles include latex of an acrylic resin, a vinyl acetate resin, a styrene-butadiene resin, a vinyl chloride resin, an acryl-styrene resin, a butadiene resin, a styrene resin, a cross-linked acrylic resin, a cross-linked styrene resin, a benzoguanamine resin, a phenol resin, a silicone resin, an epoxy resin, an urethane resin, a paraffin resin, and a fluoro resin. Preferable examples thereof include particles of an acrylic resin, an acryl-styrene resin, a styrene resin, a cross-linked acrylic resin, and a cross-linked styrene resin.

A weight average molecular weight of the resin particles is preferably from 10,000 to 200,000 and more preferably from 100,000 to 200,000, from the viewpoint of the stability of the ink composition.

An average particle diameter of the resin particles is preferably in the range of from 10 nm to 1 μm, more preferably from 10 nm to 200 nm, still more preferably from 20 nm to 100 nm, and particularly preferably from 20 nm to 50 nm.

The resin particle can be used in a dispersed state such as in latex.

Other Ingredient

The ink composition may contain, as still another ingredient other than the ingredients mentioned above, an additive such as a penetrating solvent, a moisturizing agent, a preservative agent, a mildew-proofing agent, a pH adjusting agent, and/or a chelating agent as needed. Descriptions in JPA No. 2010-90266, paragraphs 0067 to 0076 can be referred to for the detail of these additives.

Recording Medium

The recording medium used in the image forming method is not particularly restricted as long as it has an absorption amount of an ink composition (an ink composition containing a pigment and a compound represented by Formula (1)), within 20 msec$^{1/2}$ from a start of contact of the ink composition with the recording medium, of 20 ml/m$^2$ or larger according to the Bristow method, and may be plain paper or inkjet paper. For the inkjet paper, a form paper used in the field of business forms and a pressure bonding form such as a pressure bonding postcard may be suitable from the viewpoint that the effect of the invention achieved when image formation is performed at a high speed can be more remarkable.

The "absorption amount of an ink composition, within 20 msec$^{1/2}$ from a start of contact of the ink composition with the recording medium, is 20 ml/m$^2$ or larger" is a condition for distinguishing the recording medium used in the above-mentioned image forming method from a so-called "coated paper", which has a coating layer on a surface thereof. An absorption amount of commercially-available coated paper, within 20 msec$^{1/2}$ from a start of contact of the ink composition therewith, is normally is about 5 ml/m$^2$. The value which is four times 5 ml/m$^2$ was set as the lower limit in order to clarify the border between the commercially available coated paper and the coated paper employed in the image forming method.

From the viewpoint of suppressing bleeding of the ink, the absorption amount of the ink composition, within 20 msec$^{1/2}$ from a start of contact of the ink composition with the recording medium, may be preferably 150 ml/m$^2$ or less.

The Bristow method is the most common measurement method of absorption amount of a liquid in a short time and also employed in Japan Technical Association of the Pulp and Paper Industry (J'TAPPI). Details of the testing method can be referred to the descriptions in the J. TAPPI Paper and Pulp Test Method No. 51, "Method for determining the liquid absorbability of paper and board", the disclosure of which is incorporated by reference herein.

The absorption amount of the ink composition of the recording medium can be measured by using as the Bristow method a spiral scanning type Bristow's apparatus (DSA), specifically, an Automatic scanning liquid absorptometer KM500 W in [manufactured by KUMAGAI RIKI KOGYO Co., Ltd.].

The absorption amount of the ink composition within 20 $msec^{1/2}$ from a start of contact of the ink composition with the recording medium in the Bristow method is preferably from 20 ml/m² to 150 ml/m², more preferably from 25 ml/m² to 145 ml/m², still more preferably from 30 ml/m² to 140 ml/m², and most preferably from 65 ml/m² to 90 ml/m².

Drying Process

The image forming method may further include a process in which the ink applied in the ink application process is dried. By the drying, a liquid medium contained in the ink composition attached on the recording medium, which may be specifically water, pyrrolidone derivatives and other water-soluble organic solvents, evaporate and fly away to result in a colored resin film. Drying may enable to form a high quality image having little image defects such as scar or peeling on the recording medium at a high speed.

The drying can be carried out by heating using a known heating means such as a heater, a known air blowing means such as a dryer, or a combination of these means. Examples of a heating method therefor include a method of supplying heat with a heater or the like from a surface of the recording medium which is opposite to the surface of the recording medium onto which the reaction liquid has been applied, a method of applying warm air or hot air to the surface of the recording medium onto which the ink has been applied, and a heating method using an infrared heater or the like. The heating methods may be used singly or in combination of two or more thereof.

The temperature of drying by heating is not particularly restricted and may be selected in a temperature range in which drying can be achieved. For example, drying may be carried out by heating the recording medium to be in a range of from 40° C. to 80° C. by air blowing, or may be carried out by contacting the recording medium on a drying drum having a temperature of from 50° C. to 110° C. to bring the temperature of the recording medium to be from 40° C. to 80° C. These processes may be used in combination for the drying.

Cooling Process

The image forming method may further include a process in which the recording medium is once dried by heating in the above-mentioned drying process and then is cooled.

The cooling process may be any method as long as it actively lowers the temperature of the recording medium. Examples of the cooling method include a method of passing a recording medium through a cooling zone, a method of applying a cool air onto a recording medium, and a method of making a recording medium to be in touch with a cooled object.

Heat-Fixing Process

The image forming method may further include a process which is performed after the ink application and in which the ink composition on the recording medium is heat-fixed as needed. In the heat-fixing, an image formed by applying the ink composition is heated and fixed onto a recording medium. By the heat-fixing, fixation of the formed image may be better fixed on the recording medium and the rubbing resistance of the image may be further improved.

The heating is preferably carried out at a temperature equal to or higher than the minimum film forming temperature (MFT) of resin particles in the image. By heating to a temperature equal to or higher than the MFT, the particles may change into a form of a film to reinforce the image. Pressure may be applied during the heating. When heating is carried out under pressure, the pressure is preferably in the range of from 0.1 MPa to 3.0 MPa in view of smoothening of the surface.

Preferable examples of the heating method include, but not particularly limited to, a non-contact drying method such as: a heating method using a heating element like a Nichrome wire heater; a method of supplying warm air or hot air; or a heating method using a halogen lamp, an infrared lamp or the like. Examples of the method of heating-pressurizing include, but not particularly limited to, a method of performing heat fixation by contacting such as: a method of pressing a hot plate against the image formed side of the recording medium; or a method of passing the recording medium through between a pair of rollers or the like using a heating-pressurizing apparatus having a pair of heating-pressurizing rollers, a pair of heating-pressurizing belts, or a combination of a heating-pressurizing belt disposed at the image recording surface side of the recording medium and a holding roller arranged the opposite side.

EXAMPLES

The invention will now be specifically explained by way of Examples. The invention is not limited to the following Examples as long as the invention does not depart from the spirit and scope of the invention. "Part" is based on mass unless otherwise specified.

The weight average molecular weight was measured by gel permeation chromatography (GPC). In GPC, HLC-8220GPC (trade name, manufactured by Tosoh Corporation) was used, and three pieces of columns (namely, TSKGEL SUPER HZM-H, TSKGEL SUPER HZ4000, and TSK GEL SUPERHZ 2000: all trade names, manufactured by Tosoh Corporation) connected in series were used as columns, and THF (tetrahydrofuran) was used as an eluate. The measurement was performed by using an IR detector under the conditions at a sample concentration of 0.45% by mass, a flow rate of 0.35 mL/min, a sample injecting amount of 10 μL, and a measuring temperature of 40° C. A calibration curve was prepared based on eight samples of "F-40", "F-20", "F-4", "F-1", "A-5000", "A-2500", "A-1000", and "n-propylbenzene" of a standard sample "TSK STANDARD, POLYSTYRENE" (all trade names, manufactured by Tosoh Corporation).

Example 1

Preparation of Ink Composition

Synthesis of Polymer Dispersant P-1

Polymer dispersant P-1 was synthesized as shown below according to the following scheme.

P-1

88 g of methyl ethyl ketone was put in a 1000 mL three-necked flask equipped with a stirrer and a cooling tube and heated to 72° C. in a nitrogen atmosphere, to which a solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was added dropwise over 3 hours. After completing the dropwise addition and further allowing the mixture to react for 1 hour, a solution in which 0.42 g of dimethyl 2,2'-azobisisobutyrate was dissolved in 2 g of methyl ethyl ketone was added, and the temperature of the mixture was elevated to 78° C. and the mixture was heated at 78° C. for 4 hours. The obtained reaction solution was re-precipitated twice in a great excess of hexane and a precipitated resin was dried, thereby obtaining 96 g of a polymer dispersant P-1.

The composition of the obtained polymer dispersant P-1 was confirmed by 1H-NMR and the weight average molecular weight (Mw) determined by GPC was 44,600. Further, when an acid value was determined according to the method described in JIS standards (JIS K0070:1992, the disclosure of which is incorporated by reference herein), the obtained resin was revealed having an acid value of 65.2 mgKOH/g.

Preparation of Dispersion of Resin-Coated Pigment Particles (Dispersion C)

Ten parts of pigment blue 15:3 (trade name: PHTHALO-CYANINE BLUE A220, manufactured by Dainichiseika Color & Chemicals Mfg. Co., Ltd; cyan pigment), 5 parts of the polymer dispersant P-1, 42 parts of methyl ethyl ketone, 5.5 parts of an aqueous 1N NaOH solution, and 87.2 parts of ion exchange water were mixed, and the mixture was dispersed for 2 hours to 6 hours using zirconia beads (diameter: 0.1 mm) by means of a bead mill.

From the obtained dispersion, methyl ethyl ketone was removed at 55° C. under reduced pressure, and a part of water was removed therefrom. Then, the resultant was subjected to centrifugation using a 50 mL centrifuging tube by means of HIGH-SPEED CENTRIFUGAL COOLER 7550 (trade name, manufactured by Kubota Seisakusho K.K.) at 8000 rpm for 30 minutes, thereby collecting the supernatant other than the precipitate. Thereafter, a pigment concentration was determined based on the absorbance spectrum, to obtain a dispersion C, which is a dispersion of resin-coated pigment particles (pigment coated with a polymer dispersant) having a pigment concentration of 10.2% by mass.

Preparation Method of Wax 120 g of microcrystalline wax (trade name: HI-MIC 1090, manufactured by NIPPON SEIRO CO., LTD., melting temperature: 88° C.) and 80 g of compound WA-2 (specific dispersant shown above) were placed in a 2 L stainless steel disperser, and then heated to 100° C. and mixed to perform melt-mixing, thereby obtaining a uniform and viscous mixture. 800 g of hot water having a temperature of 95° C. was added to the mixture resulted by the melt-mixing, and the resultant was dispersed for 10 minutes at a high speed using a homogenizer (manufactured by NIPPON SEIKI CO., LTD., number of revolution: 10000). The disperser was cooled while continuing stirring to gradually reduce the inner temperature, thereby obtaining a wax dispersion liquid 1 in the form of a solid state dispersion (solid concentration: 20.0%). The average particle size of the wax in the dispersion was 0.2 µm.

Preparation of Sample 101

The ingredients shown in the following formulation, which include the dispersion C of (the dispersion of pigment particle) and the wax dispersion liquid 1, were mixed and filtrated by a 5 µm membrane filter to prepare a sample 101 (ink composition).

Formulation of Sample 101
1) Dispersion C . . . 29.0 parts
2) Alkylene oxide adduct of glycerol . . . 19.0 parts (compound represented by Formula (1) (l+m+n≈9, AO is a propylene oxide group)]
3) 2-pyrrolidone (manufactured by ISP Ltd.) . . . 8.0 parts
4) OLFINE E1010 (trade name, manufactured by Nissin Chemical Industry Co., Ltd) . . . 1.0 parts
5) Wax dispersion liquid 1 . . . 15.0 parts
6) Ion exchanged water . . . Balance (remaining amount added to make the total amount 100 parts)

Preparation of Samples 102 to 113

Samples 102 to 113 (ink compositions) were prepared in the same manner as in the preparation of sample 101 except that the composition was changed in the manner as shown in the Table 1 below.

SELOSOL 524 (trade name, manufactured by Chukyo Yushi Co., Ltd.) was used as the carnauba wax, and SELOSOL R-526 (trade name, manufactured by Chukyo Yushi Co., Ltd.) was used as the paraffin wax.

Formation of Image

By using DIMATIX MATERIALS PRINTER DMP-2831 (trade name, manufacture by FUJIFILM Dimatix, Inc.), each of the samples (ink compositions) prepared in the above manner was sequentially loaded into a cartridge to form an image at a conveying speed of 100 m/min. To the formed image, the following evaluation was carried out.

The image formation was carried out by using a cartridge which was prepared by providing the ink from outside into DMC-11610 (trade name, manufactured by FUJIFILM Dimatix, Inc.), that is capable of jetting 10 pl-size droplets, and a printer which was modified such that image formation can be performed at a conveying speed of 100 m/min. In the image formation, IJ-PDW70 (trade name, manufactured by MITSUBISHI PAPER MILLS LIMITED) and NPI FORM NEXT-IJ 70 (trade name, manufactured by Nippon Paper Industries Co., Ltd.) were used as the plain paper, and OK COAT L (trade name, manufactured by OJI PAPER CO., LTD.) was used as the coated paper.

Evaluation of Absorption Amount of Ink in Bristow Method

The absorption amount of an ink on a recording medium according to the Bristow method was measured by using an automatic scanning liquid absorptometer KM500WIN (trade name, manufactured by KUMAGAI RIKI KOGYO Co., Ltd.) which is a spiral scanning type Bristow's apparatus (DSA).

Specifically, the ink compositions (samples 101 to 113) shown in Table 1 below were brought into contact with the recording media shown in Table 1 below and the absorption amount of the ink composition, within 20 msec$^{1/2}$ from a start of contact of the ink composition with the recording medium, according to the Bristow method was shown in Table 1.

Evaluation (1) Rubbing Resistance

Figure 1:
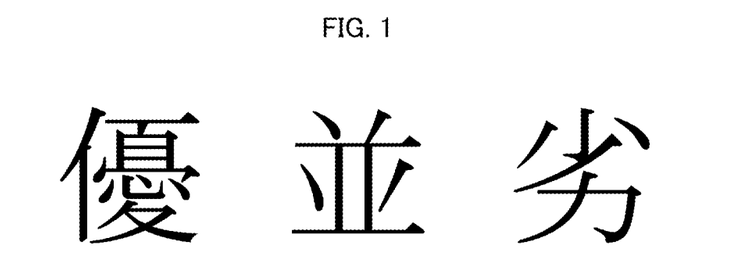
FIG. 1 is a drawing showing images of normal Chinese characters formed in Examples.
Figure 2:
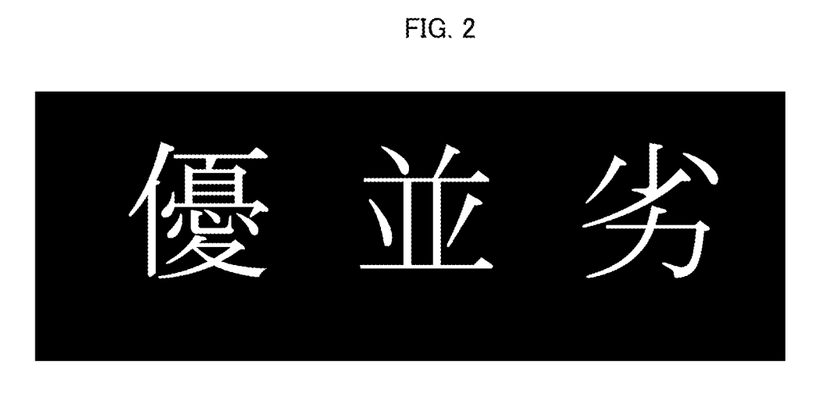
FIG. 2 is a drawing showing images of hollow Chinese characters formed in Examples.

Each sample was jetted in such an amount that the amount of ink coated was 6 g/m², images of normal Chinese characters shown in FIG. 1 and images of hollow Chinese characters shown in FIG. 2 were formed on the form paper IJ-PDW70 and NPI FORM NEXT-IJ70 (described below), which are inkjet paper. 15 minutes after the images are formed, the images were rubbed against each other while applying a pressure of 1.0 kg/cm². This operation was repeated 10 times for each paper and sensory evaluation was performed according to the following evaluation criteria by five evaluators. The average of scores by the five evaluators was calculated to obtain an evaluation index. The evaluation result is shown in Table 1 below.

Evaluation Criteria

5: Favorable image quality was obtained. No blur or bleeding of an image was observed in any of normal characters and hollow characters.

4: Acceptable image quality was obtained, although blur or bleeding of an image was slightly observed in both of normal characters and hollow characters.

3: Practically tolerable image quality was obtained. The character was distinguishable, although blur or bleeding of an image was sometimes observed in both of normal characters and hollow characters.

2: Problematic quality for practical use. Blur or bleeding of an image was observed in both of normal characters and hollow characters. Particularly, the hollow character was indistinguishable due to bleeding.

1: Significantly problematic quality for practical use. Blur or bleeding of an image was observed in both of normal characters and hollow characters, and both normal character and hollow character were indistinguishable due to bleeding or the like.

(2) Coloring Property

Nine pl solid image was formed on each of IJ-PDW70 (trade name, manufactured by MITSUBISHI PAPER MILLS LIMITED), NPI FORM NEXT-IJ70 (trade name, manufactured by Nippon Paper Industries Co., Ltd.) and OK COAT L (trade name, manufactured by OJI PAPER CO., LTD.). These images were observed and evaluation was performed according to the following evaluation criteria by five evaluators. The average of scores by the five evaluators was calculated to obtain an evaluation index.

The evaluation result is shown in Table 1 below.

Evaluation Criteria

5: The solid image portion had very bright hue and sufficiently high density.

4: The solid image portion had bright color gamut and high density.

3: The solid image portion had poor bright color gamut, low density, but acceptable for practical use.

2: Problematic quality for practical use. The solid image portion had little bright color gamut and low density.

1: Significantly problematic quality for practical use. The solid image portion had no bright color gamut and very low density.

(3) Jetting Reliability

Images of 96 lines, each of which having a length of 10 cm, were printed on KASSAI PHOTO FINISH PRO (trade name, manufactured by Fuji Photo Film Co., Ltd.) with 5.5 pL size ink droplets by using the DIMATIX MATERIALS PRINTER DMP-2831 (described above), thereby obtaining an evaluation sample 1. Then, the intervals between the 96 lines at a 5 cm portion from a portion of a start of the droplet jetting of the evaluation sample were measured using a dot analyzer DA-6000 (trade name, manufactured by Oji Scientific Instruments), and the standard deviation thereof was calculated.

Next, after printing was carried out in the preparation of the evaluation sample, the droplet jetting was ceased for 1 minutes under the environment of 25° C. and 50% RH while the printer head was held as it was. Then, printing was carried out under the same conditions, thereby producing an evaluation sample 2. The standard deviation of the intervals between the 96 lines at a 5 cm portion from a portion of a start of the droplet jetting of the evaluation sample 2 was calculated similarly as above, and the calculated value after the cessation was defined as the index for evaluating the jetting reliability.

From the calculated standard deviation value after the cessation obtained as described above, the jetting reliability was evaluated according to the following evaluation criteria.

Evaluation Criteria

5: 3 μm or more but less than 3.5 μm
4: 3.5 μm or more but less than 4 μm
3: 4 μm or more but less than 4.5 μm
2: 4.5 μm or more but less than 5 μm
1: 5 μm or more Similarly, the cessation time under the environment of 25° C. and 50% RH was changed to three minutes, five minutes, 10 minutes, and 15 minutes to produce samples 3, 4, 5, and 6, and evaluation was performed therefor. The average point of the thus obtained five samples is shown in Table 1.

TABLE 1

| | Formulation of Sample (Ink) | | | | | Recording medium | | Evaluation result | | | |
| | Alkylene oxide adduct of glycerol | | | Wax | | | Absorption | | | | |
| | | l + m + n | | | | | | | | | |
| Sample | Type of AO | (Approx. value) | Content (%) | Type* | Content (%) | Type | amount [ml/m²] | Rubbing resistance | Coloring property | Jetting reliability | Remarks |
| Sample 101 | Propyleneoxy | 9 | 19 | M | 3 | Npi Form NEXT-IJ70 | 71 | 4.6 | 4.6 | 4.4 | The Invention |
| Sample 102 | Propyleneoxy | 9 | 19 | M | 5 | Npi Form NEXT-IJ70 | 70 | 4.6 | 4.4 | 4.4 | The Invention |
| Sample 103 | Propyleneoxy | 9 | 19 | M | 9 | Npi Form NEXT-IJ70 | 70 | 4.8 | 4.2 | 4.0 | The Invention |
| Sample 104 | Propyleneoxy | 6 | 15 | C | 1.3 | Npi Form NEXT-IJ70 | 73 | 4.6 | 4.8 | 4.6 | The Invention |

TABLE 1-continued

| | | Formulation of Sample (Ink) | | | | | Recording medium | | | | |
|---|---|---|---|---|---|---|---|---|---|---|---|
| | | Alkylene oxide adduct of glycerol | | | Wax | | Absorption | Evaluation result | | | |
| | | l + m + n | | | | | | | | | |
| Sample | Type of AO | (Approx. value) | Content (%) | Type* | Content (%) | Type | amount [ml/m²] | Rubbing resistance | Coloring property | Jetting reliability | Remarks |
| Sample 105 | Propyleneoxy | 6 | 15 | C | 0.5 | Npi Form NEXT-IJ70 | 72 | 4.4 | 5.0 | 4.8 | The Invention |
| Sample 106 | Propyleneoxy | 6 | 15 | C | 0.1 | Npi Form NEXT-IJ70 | 72 | 4.4 | 5.0 | 5.0 | The Invention |
| Sample 107 | Propyleneoxy | 6 | 20 | P | 8 | IJ-PDW70 | 87 | 4.8 | 3.8 | 3.2 | The Invention |
| Sample 108 | Propyleneoxy | 4 | 36 | P | 1 | IJ-PDW70 | 88 | 4.6 | 4.8 | 4.0 | The Invention |
| Sample 109 | Propyleneoxy | 4 | 42 | P | 17 | IJ-PDW70 | 86 | 5.0 | 3.2 | 2.2 | The Invention |
| Sample 110 | Propyleneoxy | 14 | 3 | P | 0.03 | IJ-PDW70 | 86 | 3.4 | 4.0 | 5.0 | The Invention |
| Sample 111 | Ethyleneoxy | 14 | 10 | C | 2 | Npi Form NEXT-IJ70 | 73 | 4.6 | 4.2 | 4.4 | The Invention |
| Sample 112 | Propyleneoxy | 9 | 45 | — | — | OK COAT L | 5 | 1.0 | 4.2 | 2.8 | Comparative example |
| Sample 113 | None | — | — | M | 20 | OK COAT L | 5.2 | 1.8 | 4.0 | 1.0 | Comparative example |

*M: Microcrystalline wax; C: Carnauba wax; P: Paraffin wax

As shown in Table 1, in the formation of an image while conveying a recording medium at a conveying speed of 100 m/min, any of samples 101 to 111 according to one embodiment of the invention had excellent rubbing resistance and coloring property. It was found that, by the image forming method according to one embodiment of the invention, an image having a rubbing resistance, a wide color reproduction range and a high color optical density can be formed even when an image was formed on a recording medium such as a form paper at a high speed.

Example 2

In Example 1, Latex PL-01, which is explained below, was further added to the composition of the sample 101 to form a composition having the following formulation. After mixing the ingredients, the composition was filtrated by using a 5 μm membrane filter, thereby producing a sample 201.

Formulation

1) Dispersion C of pigment particle . . . 29.0 parts
2) Alkylene oxide adduct of glycerol . . . 19.0 parts (compound represented by Formula (1) (l+m+n≈9, AO=propylene oxide))
3) 2-pyrrolidone (manufactured by ISP Ltd.) . . . 8.0 parts
4) Latex PL-01 . . . 15.0 parts
5) OLFINE E1010 (trade name, manufactured by Nissin Chemical Industry Co., Ltd) . . . 1.0 parts
6) Wax dispersion liquid 1 . . . 15.0 parts
7) Ion exchanged water . . . Balance (remaining amount added to make the total amount 100 parts)

Preparation of Latex PL-01

To 120 g of water, 19.8 g of LATEMUL ASK (trade name, manufactured by Kao corporation, carboxylate emulsifier), 6 g of 5 mol/L aqueous sodium hydroxide and 0.3 g of 2,2'-azobis(2-amino-dipropane)dihydrochloride were added to be uniformly dissolved. The resultant was heated to 70° C., and then a monomer mixture of 25.9 g of styrene, 26.3 g of butyl acrylate and 5.1 g of acrylic acid was added thereto for two hours under a stream of nitrogen. Thereafter, the resultant was heated at 70° C. for two hours and at 80° C. for three hours. After cooling the resultant to room temperature, 1 mol/L aqueous sodium hydroxide was added thereto in such a manner that the pH was around 9 to prepare Latex PL-01.

The volume average particle size of the resin particle in the obtained latex was 115 nm. The solid amount of Latex PL-01 was 33%.

The rubbing resistance, coloring property and jetting reliability of the obtained sample 201 were evaluated in the same manner as in Example 1. As the result, the sample 201 showed a similar improvements as shown by the sample 201, while the sample 101 exhibited better performance in terms of the jetting reliability.

The disclosure of Japanese Patent Application No. 2012-070167 is incorporated herein by reference in its entirety All publications, patents, patent applications, and technical standards mentioned in this specification are herein incorporated by reference to the same extent as if each individual publication, patent, patent application, or technical standard was specifically and individually indicated to be incorporated by reference.

What is claimed is:

1. An image forming method comprising applying an ink composition to a recording medium to form an image, the recording medium having an absorption amount of the ink composition, within 20 msec$^{1/2}$ from a start of contact of the ink composition with the recording medium, of 20 ml/m² or larger according to the Bristow method and being conveyed in a feed direction at a conveying speed of 80 m/min or higher, and the ink composition comprising a pigment, a compound represented by the following Formula (1) at a content of from 15.0 mass % to 40.0 mass % based on a total mass of the ink composition, carnauba wax as a wax at a content of from 0.05 mass % to 15.0 mass % based on a total mass of the ink composition, and water:

Formula (1)

wherein, in Formula (1), each of l, m, and n independently represents an integer of 1 or more; the sum of l, m, and n is from 3 to 15; and each AO of $(AO)_l$, $(AO)_m$, and $(AO)_n$ independently represents an ethyleneoxy group or a propyleneoxy group.

2. The image forming method of claim 1, wherein each AO in Formula (1) is a propyleneoxy group.

3. The image forming method of claim 1, wherein the wax is in a form of a wax particle.

4. The image forming method of claim 1, wherein:
each AO in Formula (1) is a propyleneoxy group; and
the wax is in a form of a wax particle.

5. The image forming method of claim 1, wherein the ink composition comprises resin particles at a content of from 0 mass % to 1 mass % based on a total mass of the ink composition.

6. The image forming method of claim 5, wherein the resin particles are self-dispersing resin particles comprising a polymer which comprises a hydrophilic structural unit and a hydrophobic structural unit and has a glass transition temperature of 80° C. or higher.

7. The image forming method of claim 1, wherein:
each AO in Formula (1) is a propyleneoxy group;
the wax is in a form of a wax particle; and
the ink composition comprises resin particles at a content of from 0 mass % to 1 mass % based on a total mass of the ink composition.

8. The image forming method of claim 1, wherein:
each AO in Formula (1) is a propyleneoxy group;
the wax is in a form of a wax particle;
the ink composition comprises resin particles at a content of from 0 mass % to 1 mass % based on a total mass of the ink composition; and
the resin particles are self-dispersing resin particles comprising a polymer which comprises a hydrophilic structural unit and a hydrophobic structural unit and has a glass transition temperature of 80° C. or higher.

9. The image forming method of claim 1, wherein the recording medium has an absorption amount of the ink composition, within 20 $msec^{1/2}$ from a start of contact of the ink composition with the recording medium, of 65 ml/m² or larger according to the Bristow method.

* * * * *